(No Model.)

J. H. FENTON.
TOE WEIGHT FOR HORSES.

No. 286,190. Patented Oct. 9, 1883.

Witnesses:
Albert H. Adams.
O. W. Bond.

Inventor:
John H. Fenton

N. PETERS, Photo-Lithographer, Washington, D. C.

UNITED STATES PATENT OFFICE.

JOHN H. FENTON, OF CHICAGO, ILLINOIS.

TOE-WEIGHT FOR HORSES.

SPECIFICATION forming part of Letters Patent No. 286,190, dated October 9, 1883.

Application filed January 2, 1883. (No model.)

*To all whom it may concern:*

Be it known that I, JOHN H. FENTON, residing at Chicago, in the county of Cook and State of Illinois, and a citizen of the United States, have invented new and useful Improvements in Toe-Weights for Horses, of which the following is a full description, reference being had to the accompanying drawings, in which—

Figure 1:
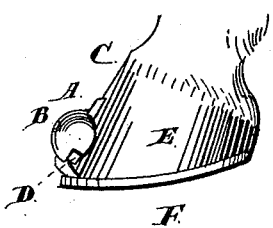
Figure 2:
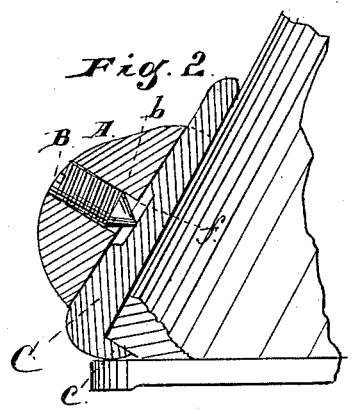
Figure 3:
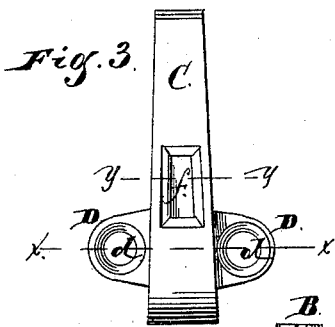
Figure 4:
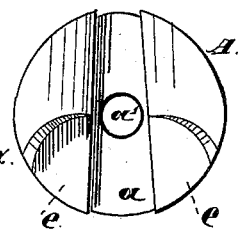
Figure 6:
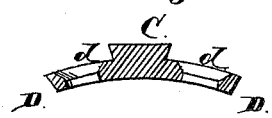
Figures 7, 8:
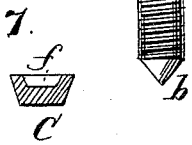
Figure 5:
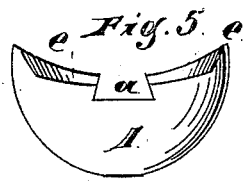

Figure 1 is a side elevation of a horse's hoof with a toe-weight attached thereto; Fig. 2, a side elevation of the toe of the hoof with the weight and spur or standard in section; Fig. 3, a top or plan view of the attaching spur or standard; Fig. 4, an under face view of the weight; Fig. 5, an end elevation of the weight; Fig. 6, a section on line $x$ $x$ of Fig. 3; Fig. 7, a section on line $y$ $y$ of Fig. 3; Fig. 8, an elevation of the weight-fastening screw.

This invention relates to devices for attaching toe-weights to the hoofs of a horse, the same being an improvement on the devices of Reissued Letters Patent No. 8,931, of which I am now the owner by assignment, and has for its objects to enable the weight to be attached to the hoof of the horse where shoes are used not having the standard or spur shown and described in said Reissued Letters Patent, or in case the standard or spur shown and described in said Letters Patent should become broken off; and its nature consists in the means hereinafter described, and pointed out in the claims, for attaining the above results.

In the drawings, A represents the weight, which may be made of malleable iron or other suitable material, of a semi-spherical form, as shown, or other suitable form, the under face being concaved or hollowed out, so as to fit the exterior surface of the hoof. This weight A has its under face a dovetailed groove, $a$, as shown in Figs. 4 and 5, or of some other suitable form, and has a screw-threaded opening, $a'$, for the passage of a set-screw for locking it in position.

B is the set-screw, having its end $b$ pointed or tapering, as shown in Figs. 2 and 8.

C is the standard or spur, made of wrought-iron or other suitable material, and having its side faces beveled to fit the side bevels of the opening $a$, and form a lock by which the weight is connected to the standard or spur. This standard or spur, at its lower end, has a prong or inwardly-turned point, $c$, to pass between the hoof and shoe, as shown in Fig. 2, and it is provided with projections or ears D, one on each side, near its lower end, each of which is provided with a countersunk opening, $d$, for the passage of screws, by means of which the standard or spur C is firmly attached to the hoof, the screws passing into the hoof. The weight A has its lower end, on the under face, partially cut away to form recesses $e$, to allow the weight to pass over the ears or projections D, so that it can be adjusted higher or lower on the hoof, as required, and the upper face of the standard or spur C is provided with a recess, $f$, to receive the point or end $b$ of the set-screw B, as shown in Figs. 2, 3, and 7.

E is the hoof of the horse.

F is an ordinary shoe.

The standard or spur C is placed on the hoof with the point $c$ passing between the shoe and the hoof, and it is secured in place by passing screws through the openings $d$ of the ears or projections D into the hoof. The point $c$ prevents the fastening-screws of the standard or spur from becoming loosened from the blows or concussions of the hoof in striking, the said hook or point passing a sufficient distance inwardly between the hoof and shoe and resting upon the upper side of the shoe, so that the force of the concussion or blow will not pass to the screws, preventing an enlargement of the screw-holes in the hoof by the pounding of the weight in a downward direction from the effects of the striking of the hoof. The weight A is slipped onto the standard or spur C, the dovetailed opening $a$ receiving the body of the standard or spur, and it is adjusted higher or lower on the foot, as required, and when adjusted is locked in position by bringing the point $b$ of the set-screw B into contact with the face of the standard or spur C in the opening $f$. The weight can be readily removed, leaving the standard or spur C in position on the hoof, if desired, and all that is necessary to be done to remove the weight is to release the set-screw B until the weight can be slipped from the standard or spur, and, if desired, the standard or spur can also be removed by removing the fastening-screws which pass through the openings $b$. This standard or spur C can be applied to the foot in connection with any shoe, and is not liable to be broken in use, as is sometimes the case where the spur is welded to the shoe, and if broken it can readily be removed and replaced by a new one, and it can also be applied to take the place of a welded spur in case of breakage of such spur.

The spur or standard C can be applied or attached to the hoof at any point where it is desired to have the toe-weight located, either in front, as shown, or on the sides, and its form can be varied somewhat to suit the place where it is to be attached.

Although provision is made for the passage of two screws for securing the standard or spur to the hoof, it is evident that a single screw, or more than two screws, could be used, if desired, the screw-holes in the standard or spur being arranged accordingly.

I am aware that it is old to secure a toe or side weight directly to the hoof of a horse by means of screws which pass through the weight into the hoof; but with this construction the jar of the foot in striking moves the weight to a greater or less degree, the result being that the screws in time enlarge the openings in the hoof in which they are inserted to such an extent that they become loose, and the toe-weight, having its attachment broken, will be disengaged from the hoof, and cannot be replaced, except by using larger screws or making the screw-holes in another place, which it is not advisable to do. This loosening of the toe-weight and its attaching-screws is entirely obviated by the use of my device, as the spur at the lower extremity thereof, which projects inward and enters between the hoof and the shoe, rests upon the face of the shoe and forms a solid support, which the jar of the hoof in striking the ground does not affect to any appreciable extent, or to an extent sufficient to loosen the screws by which the spur or standard is attached to the hoof, and cause them to enlarge their openings and become loose. I am also aware that a hollow toe-weight has been provided with a dovetailed groove adapted to a plate having beveled edges, such plate being attached to the hoof by screws passing through the plate into the hoof. Such, therefore, I do not claim; but What I do claim as new, and desire to secure by Letters Patent, is—

1. A standard or spur for a toe-weight, provided with a hook or point at its lower extremity to pass between the hoof and shoe and rest directly upon the latter, and having one or more screw-holes near its lower end for the passage of screws, substantially as and for the purposes specified.

2. The combination, with a standard or spur provided with one or more screw-holes near its lower extremity for attachment to the hoof, and with a spur or point at its lower end to pass between the hoof and shoe and rest directly upon the latter, of a toe-weight provided with a recess on its under face, adapted to receive or partially receive the standard or spur and allow the weight to rest on or near the hoof, substantially as specified.

JOHN H. FENTON.

Witnesses:
A. H. ADAMS,
O. W. BOND.